United States Patent
Erickson et al.

(10) Patent No.: US 7,064,927 B2
(45) Date of Patent: Jun. 20, 2006

(54) DISK, METHOD FOR MAKING IT FREE OF ASPERITIES UTILIZING A STEP OF EXPOSING A SURFACE OF THE DISK TO A GAS CLUSTER ION BEAM AND DISK DRIVE UNIT FOR USING THE DISK

(75) Inventors: Karl Robert Erickson, Rochester, MN (US); Douglas Allan Kuchta, Rochester, MN (US); Douglas Howard Piltingsrud, Eyota, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 373 days.

(21) Appl. No.: 10/144,485

(22) Filed: May 13, 2002

(65) Prior Publication Data

US 2003/0210496 A1    Nov. 13, 2003

(51) Int. Cl.
*G11B 5/82* (2006.01)
(52) U.S. Cl. .................................................. 360/135
(58) Field of Classification Search ................ 360/133, 360/131, 135; 369/291; 427/551–555, 596; 428/694 SG, 694 ST
See application file for complete search history.

(56) References Cited

U.S. PATENT DOCUMENTS

| | | | |
|---|---|---|---|
| 4,485,592 A | 12/1984 | Kawaguchi et al. | |
| 4,559,096 A | 12/1985 | Friedman et al. | |
| 5,302,434 A | 4/1994 | Doerner et al. | |
| 5,459,326 A | 10/1995 | Yamada | |
| 6,068,891 A * | 5/2000 | O'Dell et al. | 427/555 |
| 6,183,828 B1 | 2/2001 | Starcke et al. | |
| 6,251,835 B1 | 6/2001 | Chu et al. | |
| 6,660,340 B1 * | 12/2003 | Kirkpatrick | 427/530 |
| 6,743,481 B1 * | 6/2004 | Hoehn et al. | 427/384 |
| 2003/0021908 A1 * | 1/2003 | Nickel et al. | 427/551 |

FOREIGN PATENT DOCUMENTS

JP    11086281    * 3/1999

* cited by examiner

*Primary Examiner*—A. J. Heinz
(74) *Attorney, Agent, or Firm*—Rabin & Berdo, PC

(57) ABSTRACT

A method for making a magnetic disk, without chemical mechanical polishing to remove asperities, includes the steps of placing an annular-shaped element in a vacuum chamber, exposing a surface of the element to a beam of gas clusters while it is in the vacuum chamber, and thereafter applying a magnetic coating. The annular-shaped element may be a substrate, or it may be a substrate with a base coating such as glassy carbon or amorphous carbon. The substrate may be made of glass, preferably high quality fusion glass. The surface of the annular element may be textured by forming a sequence of concentric annular valleys, with plateaus being left between the valleys, before the magnetic coating is applied. A semiconductor wafer may also be smoothed by a beam of gas clusters to prepare the wafer for photolithography.

21 Claims, 4 Drawing Sheets

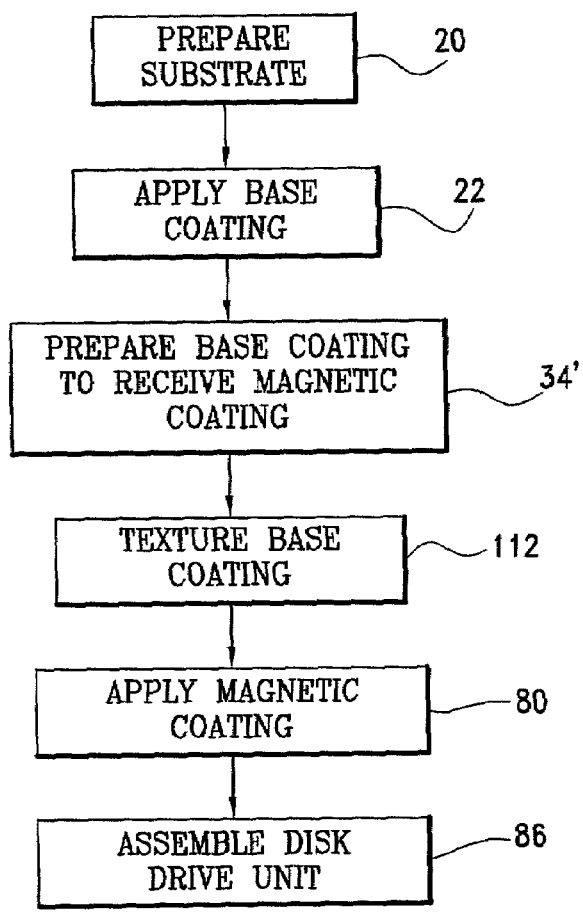
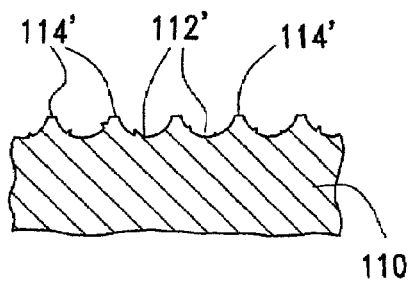
FIG. 12
FIG. 10
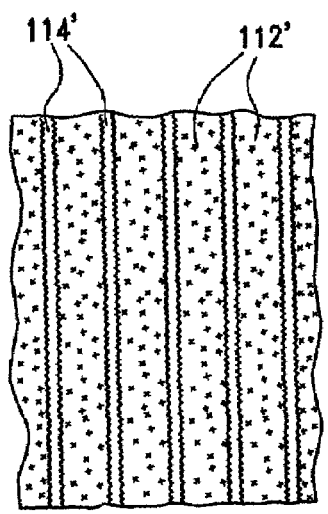
FIG. 13

DISK, METHOD FOR MAKING IT FREE OF ASPERITIES UTILIZING A STEP OF EXPOSING A SURFACE OF THE DISK TO A GAS CLUSTER ION BEAM AND DISK DRIVE UNIT FOR USING THE DISK

BACKGROUND OF THE INVENTION

1. Field of the Invention

The invention relates to a disk, particularly a magnetic disk, to a method for making the disk, and to a disk drive unit with one or more such disks.

2. Background Information

An annular-shaped substrate that carries a magnetic coating on one or both sides is commonly called a magnetic disk. Magnetic disks are typically used in disk drive units in computers, for example, for data storage applications. The substrate of a magnetic disk may be formed from aluminum or from glass, for example, and the magnetic coating carried by the substrate may be deposited not on the substrate's surface itself, but on a base coating interposed between the substrate and the magnetic coating. It is known to use glassy carbon, amorphous carbon, or a metal or metal alloy for such a base coating. The magnetic coating may be a multi-layer coating. A typical example would be a seed layer, followed by a chrome layer, followed by a cobalt-platinum-chrome layer, followed by a protective layer and a lubricating layer.

In a typical disk drive unit, one or more magnetic disks are mounted on a spindle that is rotated by a motor. Magnetic heads that are movable with respect to the magnetic disks interact with the magnetic coatings to read and write information. The heads are generally so-called "flying heads" that glide aerodynamically over the surfaces of the magnetic disks on thin films of moving air generated by the magnetic disks when they rotate. As a general rule, the information storage density increases when the flying distance between the heads and the surfaces of the disk decreases. However, the risk of a so-called "head crash," when a head actually touches the surface of a magnetic coating or possibly gouges into it, usually caused by the presence of asperities, also increases as the flying distance decreases.

It is desirable for each surface of a magnetic disk that carries a magnetic coating to be extremely flat and smooth. The reason is that a wavy surface or a rough surface that creates turbulence would make it necessary to either increase the flying distance, and thus reduce the recording density, or to increase the risk of a head crash and thus increase the prospect of losing data or physically damaging the disk drive unit. For contact recording, an asperity free, smooth surface is even more important.

It has been found that aluminum substrates are limited in how smooth their surfaces can be made. Accordingly, increasing attention has been directed to the utilization of glass substrates. Glass substrates are typically made from soda-lime or aluminosilicate glass. A manufacturing process known as the fusion process produces glass substrates with particularly smooth surfaces.

Typically, a manufacturer of disk drive units purchases glass blanks for use as substrates from a glass manufacturer. The manufacturer then subjects the glass blanks to various processes to prepare them for receiving the magnetic coatings. One of these processes is polishing, and what is known as chemical-mechanical polishing (or CMP) is frequently used. In this technique, a polishing slurry that contains very fine abrasive particles, whose surfaces depolymerize the glass chemically as they also mechanically polish the surface, is rubbed against the glass blanks, usually by a polishing machine designed for this purpose.

One drawback of CMP is that the used slurry, with its abrasive particles and glass residue, is relatively expensive to dispose of in an environmentally responsible manner. Additionally, cleaning the polished substrates is relatively costly since every last bit of abrasive grit and glass residue must be removed. Furthermore, it would be desirable for the magnetic coatings of magnetic disks to lie on asperity-free, smoother surfaces than can be achieved by CMP.

Ion beam technology has long been used, particularly in the semiconductor industry, for depositing thin films and for doping semiconductor wafers. This conventional technology uses what might be called monomer ions, or isolated charged particles. More recently, gas cluster ion beam technology has attracted attention for possible use in cleaning and smoothing surfaces and for oxidizing surfaces. This technology employs charged gas clusters rather than monomer ions. By using gas clusters rather than monomer ions, a lower kinetic energy per particle can be achieved. The use of gas cluster ion beam technology to smooth a sapphire wafer or glass surface is known. Magnetic heads are also a known application for this technology.

SUMMARY OF THE INVENTION

It is therefore a principle object of the present invention to provide an improved method for making a disk with one or more asperity-free, smooth surfaces.

Another object of the invention is to provide an improved magnetic disk.

A further object of the invention is to provide a disk drive unit having one or more of the improved magnetic disks.

In accordance with one aspect of the present invention, these and other objects which will become apparent during the ensuing detailed description can be attained by a method in which an annular-shaped element is placed in a vacuum chamber, a first surface of the element is exposed to a beam of gas clusters while it is in the vacuum chamber, and a magnetic coating is thereafter applied to the first surface.

The element may be a substrate (such as glass) with a base coating (such as glassy carbon, amorphous carbon, or a metal or metal alloy), and the method may additionally include the step of repeatedly moving the beam of gas clusters back and forth in a raster-scanning manner to smooth the surface of the base coating.

Either before or after the base coating has been smoothed, it may be textured. The texturing is preferably such that concentric annular valleys are formed in the base coating, with plateaus being left between the valleys.

The texturing may include the step of adhering a mask to the outer surface of the base coating, the mask having a plurality of slots that expose concentric annular regions of the base coating. The base coating can then be chemically etched through the slots by an acid or caustic liquid. Alternatively, the etching can be accomplished in a vacuum chamber, using bombardment by monomer ions or by gas clusters. The gas clusters may be clusters of a reactive gas.

Instead of using a mask, the texturing can be accomplished by mounting the substrate on a movable stage in a vacuum chamber, bombarding it with a beam of monomer ions or gas clusters, rotating the substrate while it is being bombarded, moving the substrate linearly, rotating it again, and repeating this rotation and linear movement until all of the valleys are formed. Alternatively, a standard mechanical texture may be provided, as is done conventionally with a diamond slurry, with asperities being cleaned off thereafter using the gas cluster ion beam technique.

The element that is smoothed in accordance with the present invention need not be a substrate bearing a base coating to which a magnetic coating will later be applied. Instead, the element may simply be a substrate, without a base coating, and the substrate itself may be smoothed by raster-scanning it with a gas cluster ion beam. The smoothed substrate may be textured so as to provide a sequence of annular valleys that are separated by annular plateaus, before a magnetic coating is added. Alternatively, the substrate may be textured before smoothing.

The present invention also extends to a magnetic disk made by the method outlined above, whether the disk has a magnetic coating on one or both sides. The invention likewise extends to a disk drive unit having one or more such disks.

In accordance with another aspect of the invention, a disk shaped element may be smoothed by placing it in a vacuum chamber and sweeping a beam of gas clusters back and forth across its surface so as to raster-scan the surface. The disk may be a semiconductor wafer, with the smoothing being conducted to prepare its surface for photolithography.

A substantial advantage of the method of the present invention is that chemical mechanical polishing of the substrate, base-coated substrate, or wafer is not needed. It is expected that this will significantly reduce manufacturing costs associated with fabrication of a high-density magnetic disk; chemical mechanical polishing will become unnecessary, as will removing remnants of the polishing slurry used during chemical mechanical polishing and otherwise cleaning the substrate, and disposing of the used slurry. The gas cluster ion beam technique for smoothing is capable of reducing surface roughness on an atomic scale, and removing any asperities that would be large enough to be detrimental to the performance of a disk drive unit.

The use of a base coating such as glassy carbon or amorphous carbon submerges asperities on the substrate. It is anticipated that smoothing the base coating with the aid of gas cluster ion beam processing will be more rapid, and less costly, than it would have been if gas cluster ion beam processing had been used to remove asperities from the substrate itself, without the presence of a base coating.

BRIEF DESCRIPTION OF THE DRAWINGS

FIG. 10 is a flow chart of the primary steps in a method of making a magnetic disk and a disk drive in accordance with the second embodiment.

FIG. 12 is a cross-sectional view of a portion of a base coating after texturing using a modified procedure.

FIG. 13 is a top plan view of a portion of a base coating after texturing using the modified procedure.

DETAILED DESCRIPTION OF THE PREFERRED EMBODIMENTS

First Embodiment

Figure 1:
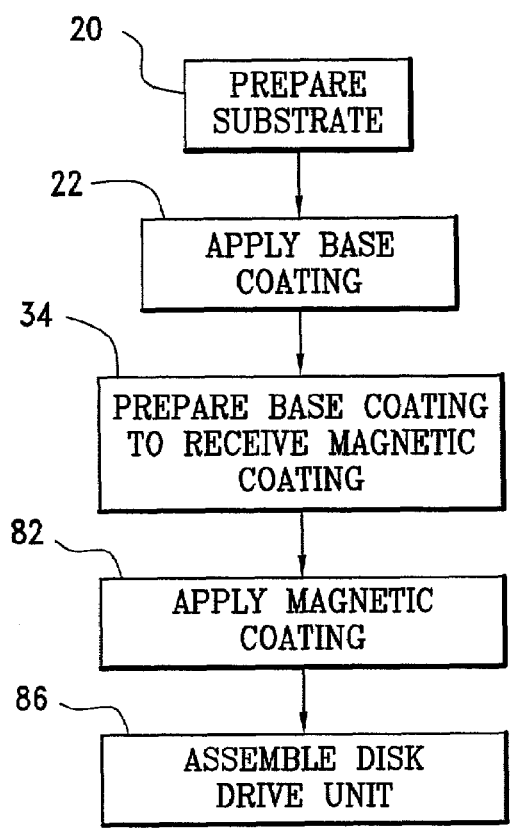
FIG. 1 is a flow chart of the primary steps in a method of making a magnetic disk and a disk drive in accordance with a first embodiment of the present invention.

A first embodiment of a process for fabricating a magnetic disk, and a disk drive unit having one or more such disks, is illustrated in FIG. 1. A substrate is prepared in step 20. The substrate is preferably made of a sheet of commercially available glass about one millimeter thick. Suitable sheets of high quality glass that are made by what is known as the fusion process and that have smooth, flat surfaces can be obtained from Corning Incorporated (of One Riverfront Plaza, Corning, N.Y. 14831, USA) under purchasing code 1737. The surfaces of the sheets are protected by thin plastic film until ready for use.

Figure 2:
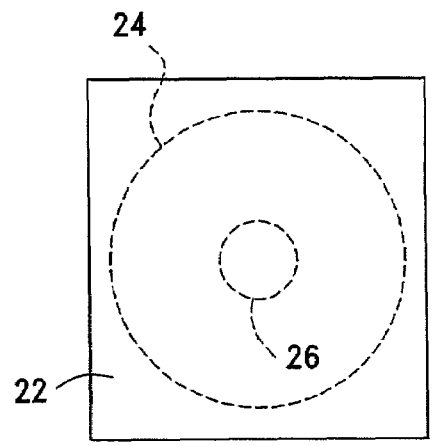
FIG. 2 is a top plan view of a stack of glass sheets from which disk-shaped substrates are made.

A number of substrates can be fabricated simultaneously by stacking such film-protected sheets of glass and fabricating them simultaneously. FIG. 2 illustrates the uppermost sheet 22 of a stack. The sheets are cut along dotted line 24 to provide an outer diameter of 95 millimeters and along dotted line 26 to provide a central opening with a diameter of 25 millimeters. A preferred way to cut the glass is to use abrasive fluid jet cutting. This technique is explained in more detail in the assignee's U.S. patent application Ser. No. 10/035,590, filed Nov. 9, 2001. After the substrates have been cut from the sheets of glass, they are thoroughly cleaned and the plastic protective film is removed.

Figure 3A:
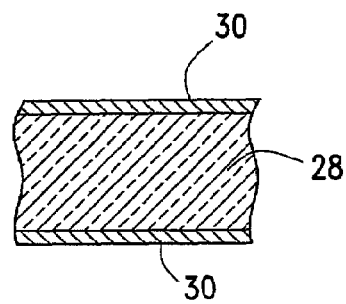
FIG. 3A is a cross-sectional view illustrating a broken-away portion of a substrate with a base coating on its top side and a base coating on its bottom side.

Returning now to FIG. 1, a base coating is supplied to the top and bottom surfaces of a substrate in step 22. The base coating preferably consists of carbon, either glassy carbon (produced, for example, by pyrolitically decomposing a layer of a polymer resin of high aromaticity and molecular weight, such as a phenolic resin that has been deposited on the substrate) or amorphous carbon (produced, for example, by sputtering carbon onto the substrate), although a sputtered layer of metal or metal alloy may also be used. FIG. 3A is a cross-sectional view of a portion of the substrate, designated by reference number 28, with a base coating 30 applied to the top and bottom sides (the relative thickness of the base coating 30 is exaggerated in the drawing for purposes of illustration). If desired, the base coating 30 may include an adhesion layer beneath the carbon layer. A suitable adhesion layer is described in the assignee's U.S. patent application Ser. No. 09/862,552, filed May 22, 2001.

Although flat sheets of glass with smooth upper and lower surfaces are commercially available for use during fabrication of the substrate 28, as mentioned above, asperities (tiny surface features that impart a minute degree of roughness)

are nevertheless present. The base coating 30 should have a thickness great enough to submerge such asperities to a depth such that they remain submerged even after further processing of the base coating 30, described below.

The further processing of the base coating 30 is conducted in step 34 (FIG. 1). During this further processing, the outer surfaces of the top and bottom base coatings 30 are smoothed by a process known as the gas cluster ion beam technique. This technique will be described in more detail shortly. After gas cluster ion beam smoothing, step 34 is completed by partially oxidizing the outer surface of the top base coating 30 and the bottom base coating 30 to enhance adhesion of subsequent layers. This partial oxidation is optional, and may be omitted unless enhanced adhesion is needed.

Figure 4:
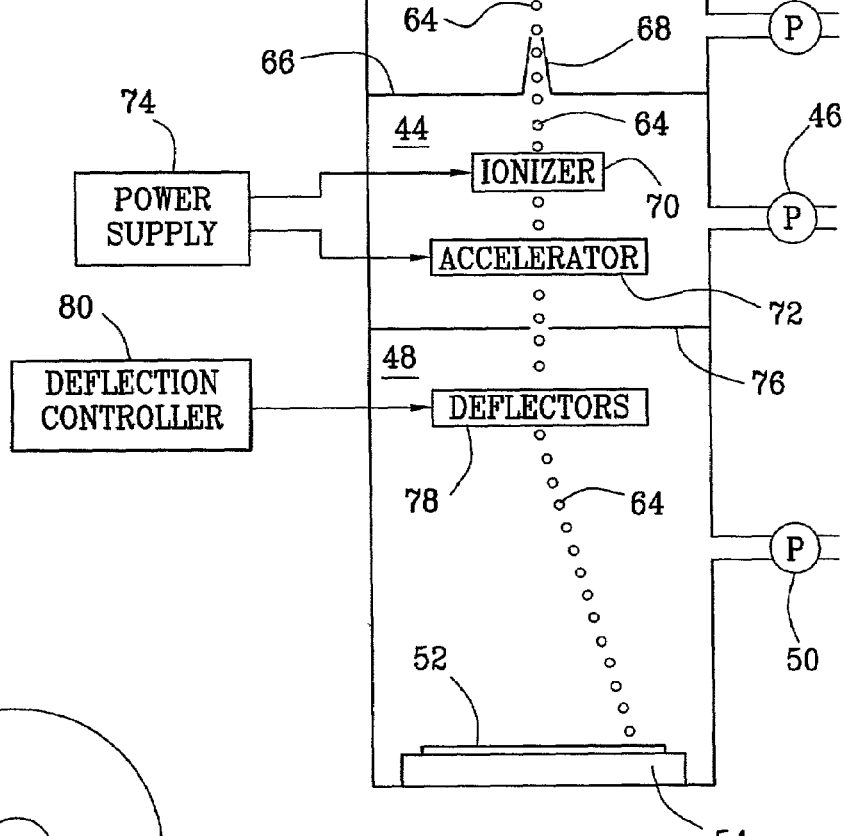
FIG. 4 is a cross-sectional view illustrating a coated substrate inside a gas cluster ion beam apparatus.

A gas cluster ion beam (GCIB) apparatus 36 is shown in FIG. 4. The GCIB apparatus 36 includes a vacuum vessel 38 having a first chamber 40 that is evacuated by a pump 42, a second chamber 44 that is evacuated by a pump 46, and a third chamber 48 that is evaluated by a pump 50. The coated substrate, designated by reference number 52 in FIG. 4, is mounted on a support 54 in the third chamber 48.

A gas supply 56 is connected to the GCIB apparatus 36 by a tube 58 having a metering valve 60 in it. The tube 58 conveys gas from the supply 56 to a venturi nozzle 62 in the chamber 40. During the smoothing operation, the gas is preferably an inert gas such as argon or nitrogen.

The gas enters the chamber 40 by way of a small aperture in the nozzle 62. The gas particles clump together, due to van der Waals forces for gasses that are atomic mixtures, and due to London dispersion forces, to form aggregates known as gas clusters. Gas clusters are illustrated schematically in FIG. 4 by small circles bearing reference number 64.

The chambers 40 and 44 are separated by a partition 66 that supports a hollow skimmer member 68. The skimmer member 68 has an open end at a position to receive a column or beam of gas clusters 64 from the nozzle 62. Gas that enters the chamber 40 without forming clusters, or that forms clusters not aligned with the skimmer member 68, is expelled from chamber 40 by pump 42.

The beam of gas clusters 64 that enters chamber 44 passes through an ionizer 70, where at least some of the particles in the clusters 64 are ionized. The charge distribution over a cluster 64 is uniform. This ionization may be accomplished by bombarding clusters 64 with electrons. After the clusters 64 have been ionized, they pass through an accelerator 72. The accelerator may include one or more electrodes which have apertures for passage of the clusters 64 and which are supplied with a voltage to accelerate the clusters. The ionizer 70 and accelerator 72 receive energy from a power supply 74. The degree of ionization of the clusters 64, and the amount of acceleration that the clusters 64 receive (and thus their ultimate velocity), can be controlled by adjusting power supply 74.

The ionized and accelerated gas clusters 64 enter the chamber 48 through an aperture (not numbered) in a partition 76 between the chambers 44 and 48. They then pass through an assembly of deflectors 78. Although not shown, the deflectors 78 may include a first pair of deflectors to control the trajectory of the clusters 64 in one plane and a second pair of deflector electrodes to control the trajectory in an orthogonal plane. The pairs of electrodes receive control voltages from a deflection controller 80. Since the trajectory of the clusters 64 can be controlled by electrostatic forces in this way in orthogonal planes, the base coating 30 (see FIG. 3A) on the side of the coated substrate 52 that is exposed to the beam of gas cluster 64 can be swept in a raster-like fashion, back and forth along a line that also moves back and forth, by the deflection controller 80.

The kinetic energy carried by the gas clusters 64 is a function of the mass of the clusters and the square of their velocity. The kinetic energy thus rises as the mass of the clusters increases, but so too does the area of the coated substrate 52 against which the clusters 64 impinge. It should also be noted that the ionizer 70 may be controlled so as to ionize less than all of the gas particles in the clusters 64. The energy of the clusters 64 impinging against the coated substrate 52 is dispersed, equally among its constituent particles, in comparison with the energy that would have been carried by individual, unclustered ions. The surface is smoothed laterally without appreciable subsurface damage. The result is that GCIB apparatus 36 gently removes surface roughness, or asperities, from the coated substrate 52. Any pits or crevices that might be present are also removed, or at least reduced.

Figure 5:
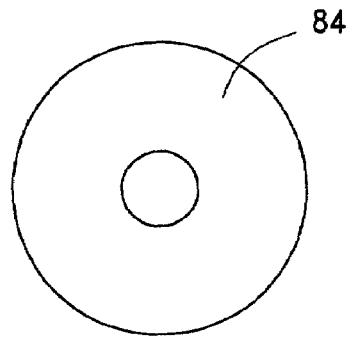
FIG. 5 is a top plan view of a magnetic disk made in accordance with the method shown in FIG. 1.
Figure 3B:
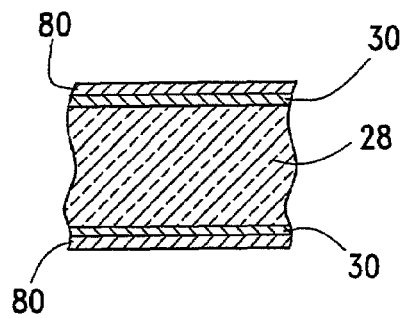
FIG. 3B is a cross-sectional view corresponding to FIG. 3A, after a magnetic coating has been added to the top side and to the bottom side.

Returning now to FIG. 1, after the base coating 30 on both sides of the substrate has been smoothed by gas cluster ion beam processing and after the smoothed surfaces have been partially oxidized (as previously mentioned) to prepare them for magnetic coatings, magnetic coating 80 (see FIG. 3B) is applied to the base coating 30 on both sides of the substrate in a step 82. The magnetic coating 80 is preferably a multi-layer coating. An example would be, first, a seed layer (such as sputtered Ni; P), a sputtered chrome layer on the seed layer, and then a cobalt-platinum-chrome layer. A wear resistant layer would be desirable on the cobalt-platinum-chrome layer, followed by a lubricating layer. The wear resistant layer may be a sputtered, diamond-linked carbon layer. This completes the fabrication of a magnetic disk 84, which is shown in FIG. 5.

In a step 86, a disk drive unit having one or more of the magnetic disks 84 is assembled. An example of such a disk drive unit is shown in FIG. 6.

Figure 6:
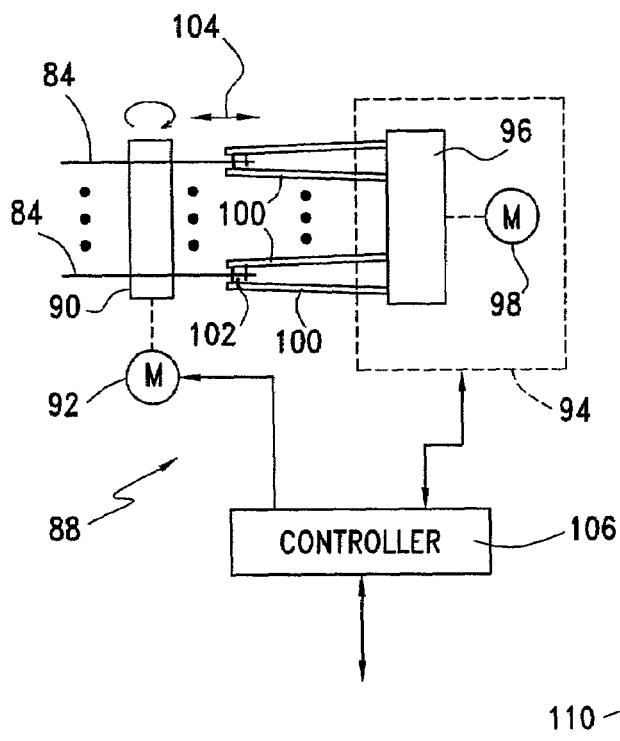
FIG. 6 schematically illustrates a disk drive unit with disks made in accordance with the present invention.

In FIG. 6, a disk drive unit 88 includes a plurality of magnetic disks 84 that are carried by a rotatably mounted spindle 90 which is driven by a motor 92. An actuator 94 includes a pivotably mounted carriage 96 that is driven by a motor 98. Arms 100 that carry read/write heads 102 are connected to the carriage 96. When motor 98 pivots the carriage 96, the heads 102 sweep across the top and bottom surfaces of the disks 84 in an arc. The net effect is that the heads 102 move toward the spindle 90 or away from the spindle 90, as illustrated by an arrow 104, and can thus write to and read from tracks (not shown) on the disks 84 at different radii. The disk drive unit 88 also includes a controller 106 that is connected to the motor 92 and the actuator 94, and that communicates with a host device (not shown).

Although the magnetic disks 84 in this first embodiment have included base coatings 30 of carbon (for example) that is smoothed using the gas cluster ion beam technique, the base coatings 30 may be omitted. In such a case, asperities on the upper and lower surfaces of the substrate 28 itself would be removed using the gas cluster ion beam technique. The magnetic coating 80 would then be applied directly to the upper and lower sides of the substrate 28, or to adhesion films (not shown) that have been formed on the upper and lower sides.

In another modification, the element that has been identified as coated substrate 52 in FIG. 4 is replaced by a wafer sliced from a purified semiconductor ingot. The GCIB apparatus 36 is then used to smooth the surface of the wafer in preparation for production of integrated circuit chips.

Second Embodiment

Figure 7:
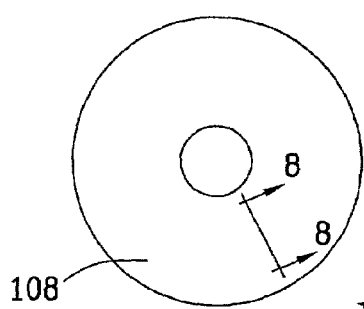
FIG. 7 is a top plan view of a magnetic disk made by a method in accordance with the second embodiment of the invention.

A magnetic disk 108 made in accordance with a second embodiment of the process of the present invention is illustrated in FIG. 7. Like the disk 84 in FIG. 5, the disk 108 in FIG. 9 includes a substrate, a base coating (such as glassy carbon or amorphous carbon, although metal or a metal alloy may be used) on the top side and the bottom side of the substrate, and a magnetic coating on the top base coating and the bottom base coating. Unlike the disk 84 of FIG. 5, however, the base coating on the top and bottom sides of the substrate for magnetic disk 108 is textured. The texture is such that concentric, annular valleys are carved out of the base coating at spaced-apart positions, leaving thin, annular, concentric plateaus between the valleys. When the magnetic coating is applied, the presence of these plateaus helps align the magnetic moments of the magnetic domains in a tangential direction. This enhances the magnetic properties of the magnetic coating. Furthermore, it is anticipated that the texturing will alter the aerodynamic interaction between the magnetic disk and the heads in a favorable manner.

Figure 8:
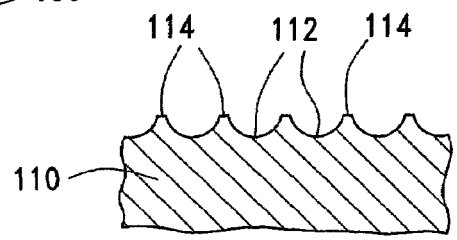
FIG. 8 is a cross-sectional view of a portion of a base coating after texturing.
Figure 9:
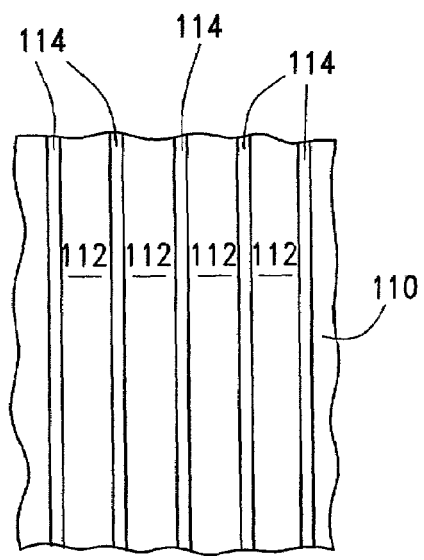
FIG. 9 is a top view of a portion of the base coating after texturing.

FIG. 8 illustrates a cross section of a cutaway portion of the base coating, taken along line 8—8 of FIG. 7. The base coating itself is marked by reference number 110 in FIG. 8. The valleys are marked by reference number 112, and the plateaus between them are marked by reference number 114. FIG. 9 shows a top view of a cutaway portion of the base coating 110.

The process for making the disk 108 is shown schematically in FIG. 10. The process includes a step 20 of preparing a substrate and a step 22 of applying a base coating; these steps are the same in the first embodiment (see FIG. 1). The process of FIG. 10 also includes a step 80 of applying magnetic coatings to the top and bottom sides and a step 86 of assembling a disk drive unit, and these steps are also the same as in the first embodiment. Additionally, the process of FIG. 10 includes a step 34' that is almost the same as step 34 of FIG. 1, the difference being that the base coating is not partially oxidized in step 34' after smoothing by the gas cluster ion beam technique. The partial oxidation (if any) is not performed until the conclusion of the next step (which is texturing the base coating). With texturing, adhesion is increased and partial oxidation is less likely to be needed. The texturing step is identified by reference number 112 in FIG. 10, and will be described in more detail hereafter.

Figure 11:
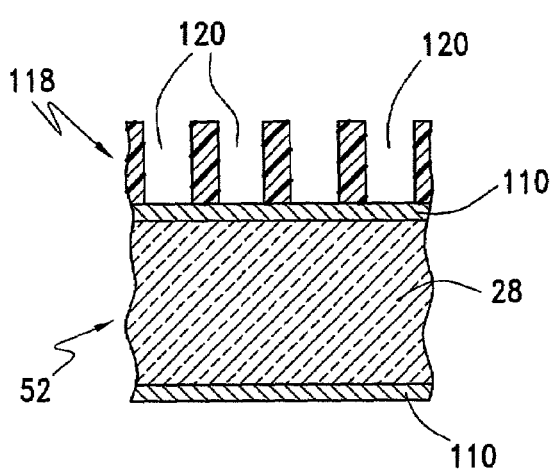
FIG. 11 is a cross-sectional view of a portion of a coated substrate with a polymer mask on the top surface.

After completion of step 34', the smoothed, coated substrate 52 (see FIG. 4) is removed from the GCIB apparatus 36. The top side of the coated substrate 52 is spin coated with a photoresist layer (not shown) that is then exposed through an optical mask having concentric rings. After the photoresist is developed, a polymer mask 118 (see FIG. 11) of photoresist material, having concentric, annular slots 120 for the valleys 112 that are to be formed, is left on the coated substrate 52.

The coated substrate 52 with its polymer mask 118 is then returned to the GCIB apparatus 36 (FIG. 4) for further processing. With the regions that are to become plateaus 114 being protected by the polymer deposits, the coated substrate 52 is again subjected to gas cluster ion beam processing, but this time with a reactive gas such as oxygen rather than an inert gas. That is, the masked substrate 52 is raster-scanned by beams of clusters 64 of a reactive gas. The clusters 64 of reactive gas degrade the polymer of the mask 118 where they impinge on the polymer, but the underlying portions of the base coating 110 are shielded. In the slots 120, however, the ionized clusters 64 of reactive gas etch valleys having slightly coarsened bottoms. The coarsened bottoms may then be smoothed, if desired, by further raster scanning of the masked substrate 52 using an inert gas. This would leave smoothed-bottom valleys 112 as shown schematically in FIG. 8 when the remnants of the mask 118 are removed. After the base coating 110 on both sides of the substrate has been textured in this manner, the base coating 110 is partially oxidized to complete step 112.

In a variation of the second embodiment, the masked, coated substrate (FIG. 11) is not returned to the GCIB apparatus 36. Instead, the base coating 110 is chemically etched through the slots 120 of the polymer mask 118. This leaves roughened valleys 112' between smooth-topped plateaus as shown schematically in FIGS. 12 and 13. FIG. 12 is a cross sectional view corresponding to FIG. 8, and FIG. 13 is a top plan view corresponding to FIG. 9. The small x's shown in FIG. 13 in the valleys 112' are intended to signify surface roughness.

When the magnetic coating is applied during step 80 in this alternative, it will be somewhat rough in the valleys 112'. Where it counts, though, on top of the plateaus 114', it will be smooth due to the smoothness imparted during the gas cluster ion beam smoothing during step 34'.

Figure 14:
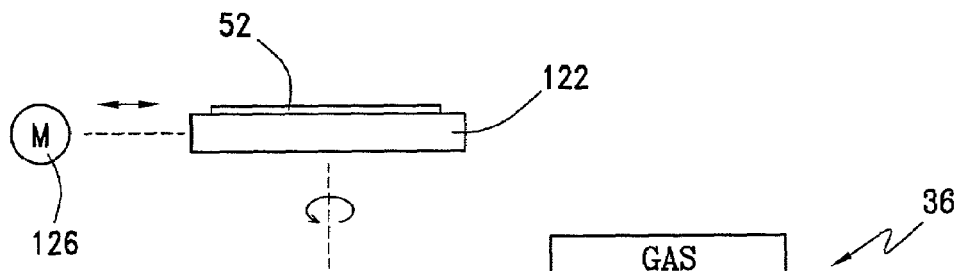
FIG. 14 schematically illustrates a movable stage for holding a coated substrate during processing by the gas cluster ion beam apparatus of FIG. 4 in a further modified texturing procedure.

A further modification of the second embodiment will now be discussed with reference to FIGS. 4 and 14. The support 54 inside the GCIB apparatus 36 is replaced by a movably mounted stage 122 to which the coated substrate 52 is secured. The stage 52 is rotatable by a motor 124, and is also movable along a linear path by a motor 126. When the base coating is textured during step 112 (FIG. 10), the deflectors 78 do not receive deflection voltages. Consequently, the beam does not raster-scan the surface of the coated substrate 52, but instead remains stationary. The valleys are formed individually while the stage 122 is rotated, at different linear positions of the stage, during bombardment with ionized clusters of a reactive gas. This can be followed, if desired, by further rotation of the stage and linear stepping during bombardment with an inert gas in order to smooth the valleys.

In yet another variation, the base coating is textured before it is smoothed by the GCIB apparatus 3b. For example, it may be mechanically textured using a diamond slurry, followed by GCIB smoothing to remove asperities, particularly asperities on the plateaus left by the mechanical texturing.

It should be understood that the invention is not necessarily limited to the specific process, arrangement, materials, and components shown and described above, but may be susceptible to numerous variations within the scope of the invention.

We claim:

1. A method for making a magnetic disk, comprising the steps of:
    (a) placing an annular-shaped element in a vacuum chamber, the element having a first surface and a second surface opposite the first surface;
    (b) exposing the first surface of the element to a beam of gas clusters while it is in the vacuum chamber; and
    (c) thereafter applying a magnetic coating to the first surface.

2. A magnetic disk made by the method of claim 1.

3. A disk drive unit having a rotatably mounted spindle, a magnetic disk made by the method of claim 1 mounted on the spindle, a head, an arm supporting the head, and an actuator to move the arm relatively to the magnetic disk.

4. The method of claim 1, wherein the element comprises a substrate with a base coating, the first surface of the element being an outer surface of the base coating, and wherein step (b) further comprises repeatedly moving the beam back and forth to raster-scan the outer surface of the base coating to remove asperities and smooth the outer surface.

5. A magnetic disk made by the method of claim 4.

6. A disk drive unit having a rotatably mounted spindle, a magnetic disk made by the method of claim 4 mounted on the spindle, a head, an arm supporting the head, and an actuator to move the arm relatively to the magnetic disk.

7. The method of claim 4, further comprising the step of texturing the base coating.

8. The method of claim 7, wherein the step of texturing the base coating comprises forming a plurality of concentric annular valleys in the base coating, with plateaus being left between the valleys.

9. The method of claim 7, wherein the step of texturing is conducted after the base coating has been smoothed.

10. The method of claim 7, wherein the step of texturing is conducted before the base coating has been smoothed.

11. The method of claim 7, wherein the step of texturing comprises adhering a mask to the outer surface of the base coating, the mask having a plurality of slots that expose concentric annular regions of the outer surface.

12. The method of claim 11, wherein the step of texturing further comprises the step of etching valleys where the concentric annular regions are exposed by the slots of the mask.

13. The method of claim 12, wherein the step of etching is conducted in a vacuum chamber.

14. The method of claim 13, wherein the step of etching is conducted using a gas cluster ion beam.

15. The method of claim 7, wherein the step of texturing is conducted in a vacuum chamber, and comprises rotating the substrate while exposing the outer surface of the base coating to a beam, moving the substrate linearly, and rotating the substrate again while exposing the outer surface of the base coating to a beam.

16. A magnetic disk made by the method of claim 7.

17. A disk drive unit having a rotatably mounted spindle, a magnetic disk made by the method of claim 7 mounted on the spindle, a head, an arm supporting the head, and an actuator to move the arm relatively to the magnetic disk.

18. The method of claim 1, further comprising the step of texturing the first surface of the element to form a plurality of concentric annular valleys and plateaus between the valleys.

19. A magnetic disk made by the method of claim 18.

20. The method of claim 1, wherein the element comprises a glass substrate having a base coating that includes a carbon layer, and wherein the first surface is a surface of the carbon layer.

21. The method of claim 1, further comprising the steps of exposing the second surface of the element to a beam of gas clusters, and thereafter applying a magnetic coating to the second surface.

* * * * *